Sept. 24, 1963 J. M. FIELD 3,105,121

REPERTORY DIALER

Filed April 21, 1959 3 Sheets-Sheet 1

INVENTOR
J. M. FIELD
BY John E. Wagner
ATTORNEY

Sept. 24, 1963 J. M. FIELD 3,105,121

REPERTORY DIALER

Filed April 21, 1959 3 Sheets-Sheet 2

INVENTOR
J. M. FIELD
BY John E. Wagner
ATTORNEY

INVENTOR
J. M. FIELD
BY John E. Wagner
ATTORNEY

United States Patent Office
3,105,121
Patented Sept. 24, 1963

3,105,121
REPERTORY DIALER

James M. Field, Whippany, N.J., assignor to Bell Telephone Laboratories, Incorporated, New York, N.Y., a corporation of New York Filed Apr. 21, 1959, Ser. No. 807,835
8 Claims. (Cl. 179—90)

Figure 1:
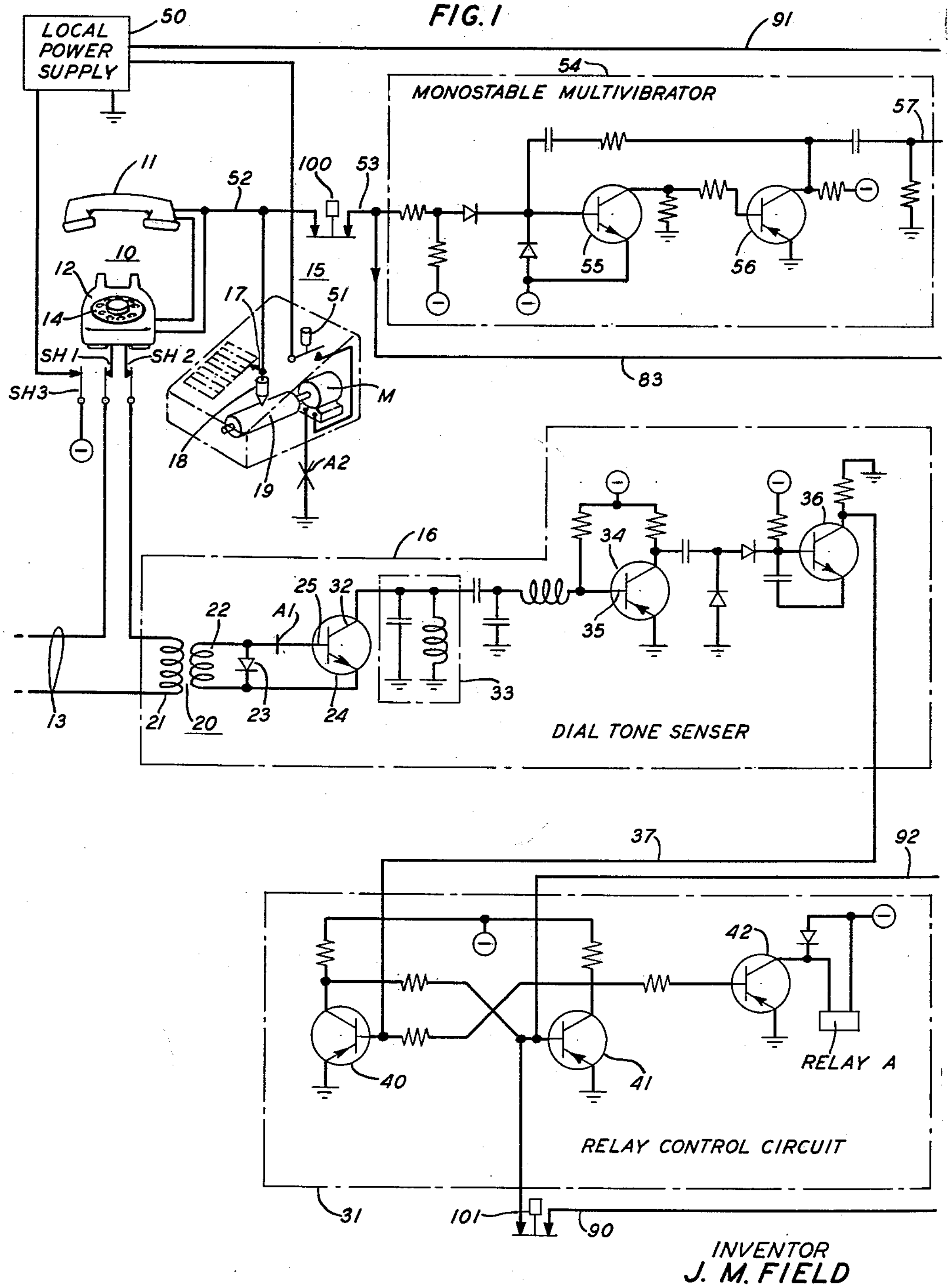

This invention relates to telephone substation apparatus and more particularly to repertory callers.

Repertory dialing mechanisms are recognized as offering to the telephone subscriber the convenience of simplified calling or dialing operations for any of a large number of frequently called telephone numbers. In typical usage of apparatus of this type the subscriber in order to call any of his selected numbers needs only lift the telephone handset from the cradle, thereby connecting the telephone set to the line, select the number to be called by moving a pointer to a position opposite the name of the selected party and operate a call button, which initiates the automatic generation and transmission of digit pulses corresponding to the chosen subscriber's number.

Characteristically, in such apparatus the telephone numbers are stored in the form of edge perforations on coded disks, perforations in a tape or card, or as recorded impulses on a magnetic drum. The latter type of apparatus is disclosed in the copending patent application of J. H. Ham, Jr., H. J. Hershey, L. A. Hohmann, Jr., and F. W. Kinsman, Serial No. 677,976, filed August 13, 1957, which issued on June 14, 1960 as Patent No. 2,941,043.

With added convenience and simplicity of operation offered by repertory dialers, one difficulty has been encountered. That is with the apparatus set into operation by the single movement of the calling button, it may institute the reproduction of the dialing digits prior to the time that the telephone central office is conditioned to receive the dial pulses, as indicated by a dial tone on the telephone line. In use of the ordinary handset the telephone subscriber is accustomed to waiting for the dial tone, but with the convenience of repertory dialers there is a greater possibility of less attention being paid by the user to the dialing operation which will necessarily result in a dialing error.

This problem is even more clearly seen when the repertory dialer is connected for use over a private branch exchange in which certain of the recorded numbers are those within the exchange and others outside thereof. In order to make an internal call it is similarly required that a dial tone be on the line for beginning the operation. In order to make an outside call, the first dial tone must be received, the digit "9" or other predetermined digit must be dialed to reach the telephone central office and a central office dial tone must appear on the line for completion of the dialed number. Under these circumstances, the completion of a call involves the sequential operations of manually lifting the handset to close the switchhook contacts, detecting a dial tone, operating the calling button to commence the calling cycle, manually interrupting the cycle after the initial digit, detecting a second dial tone and reinstituting the automatic dialing operation. To require the subscriber to perform these functions would counterbalance the convenience of repertory dialers. Attempting to interpose in the recording, sufficient delays to account for these two dial-tone wait periods does not assure error-free dialing in the case where an abnormally great length of time is required to receive either dial tone.

With this statement of the problem in mind it is a general object of this invention to improve repertory dialers.

A more specific object of this invention is to minimize the possibility of dialing errors due to outpulsing of digits prior to conditioning of the central office for such reception.

These objects are achieved in accordance with this invention, one embodiment of which comprises a sensing mechanism connected to the telephone line tuned to detect the presence or absence of dial-tone signals, e.g., 660 cycle per second tones, and means for preventing the outpulsing of digits until a dial tone is detected. The apparatus also includes means for segregating the initial digit from the remainder produced during the outpulsing operation and a counter determining the digit dialed. These last means are combined to identify the first digit outpulsed, and under the conditions of an initial digit constituting a "9," disable the outpulsing mechanism until a second dial tone is detected.

One feature of this invention involves the presence of dial-tone responsive means for controlling the operation of the outpulsing mechanism of a repertory dialer.

Another feature of this invention relates to the cooperative relationship between the dial-tone responsive means and a digit-identifying circuit for establishing the logical order of operation of the outpulsing mechanism.

Figure 2:
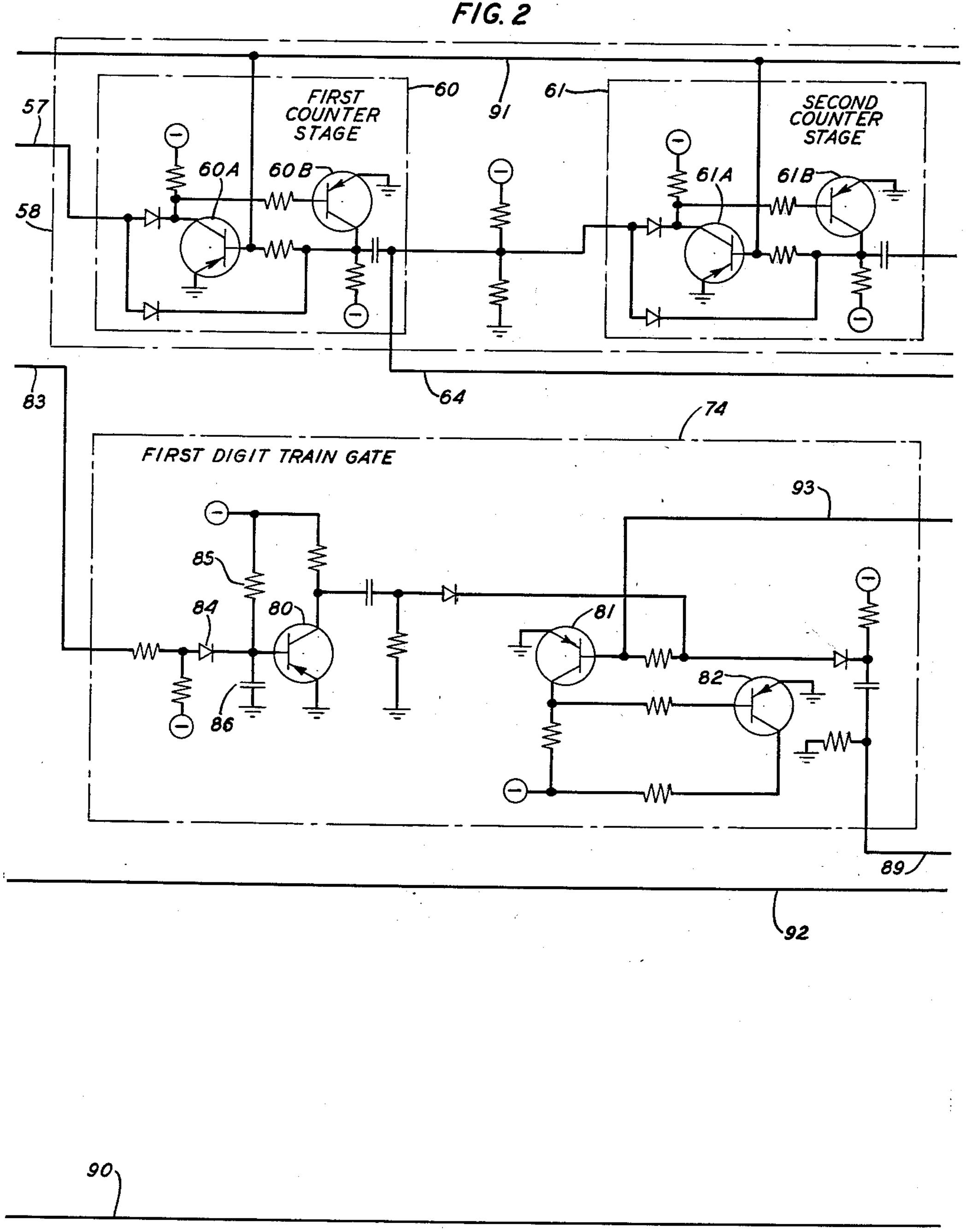
Figures 3, 4:
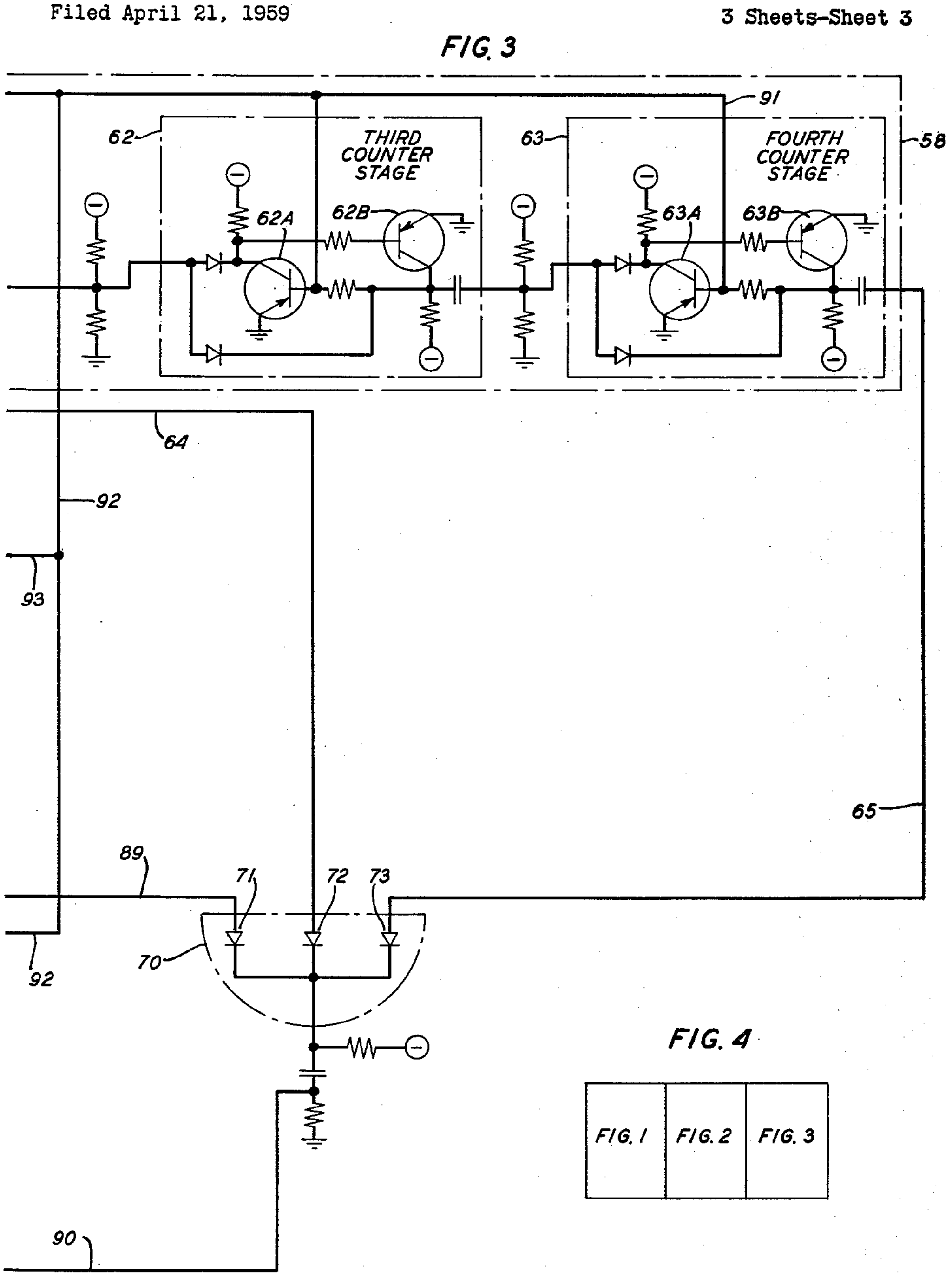

A more complete understanding of this invention may be had from the following detailed description and by reference to the drawing in which:

FIGS. 1, 2 and 3 constitute an electrical schematic representation of this invention with the essential elements of the repertory dialing mechanism shown; and FIG. 4 is an illustration of the arrangement of FIGS. 1, 2 and 3.

Referring now to FIGS. 1, 2 and 3, this invention may be seen as associated with the conventional telephone set 10 including a handset 11 and deskstand 12, the latter including switchbook contacts SH1 and SH2 employed for connecting the telephone set 10 to the telephone line 13 and SH3 associated with the local power source for the repertory apparatus. In addition to a conventional calling dial 14 of the telephone set 10 is a repertory dialer 15 shown in simplified outline form as including externally an array of indicia, the names of selected parties, a movable pointer 17 for selecting the party to be called and an ON button 51. Within the repertory dialer 15 are a magnetic record-reproduce head 18 mechanically coupled to the pointer 17 and including an air gap positioned adjacent a magnetic drum 19. The drum 19 is journaled for rotation to be driven by a motor M. Further details of the repertory dialer 15 and associated reproduce-record circuitry may be seen in the above-identified patent. For purposes of understanding this invention, such aspects of the apparatus are not essential.

Further coupled to the repertory dialer 15 and the telephone line 13 is the control circuitry for the dialer 15. This circuitry includes a dial-tone senser 16 which is coupled by a transformer 20 to the telephone line 13 with a low impedance primary winding 21 in series with one of the telephone line conductors 13. Bridging the secondary winding 22 of the transformer 20 is a diode 23 to provide limiting of the level of energy introduced into the dial-tone senser and further serving to establish the bias of a first transistor amplifier stage 24. In series with the base electrode 25 of the transistor 24 are the normally closed contacts A1 of a control relay A of FIG. 1, forming a part of the relay control circuit 31 hereinafter described. The collector circuit 32 of the transistor 24 includes a parallel tuned network 33 constituting a filter tuned to the dial-tone frequency, and coupling the first transistor stage 24 to a transistor 34 as a control bias to operate transistor 34 as a switch. Delay inherent in the time constant of the filter network 33 and base circuit 35 of transistor 34 provides protection from erroneous signals in addition to that of the frequency selective nature of the filter network 33. A third transistor stage 36, coupled to the transistor 34, develops sufficient output power to operate a transistor bistable multivibrator made up of the transistors 40 and 41 in the relay control circuit 31. The bistable multivibrator drives a single amplifier stage 42 having the relay A in its output. The relay A constitutes the primary control of the motor M in the repertory dialer 15 during operation. The dial-tone senser 16 is conditioned for operation upon the closure of switchhook contacts SH3 by the application of necessary bias voltages supplied by the local power supply 50, and in the presence of a dial tone on the telephone line 13 provides a control input for the motor control relay A. The relay A includes the normally closed contacts A1 at the base input to the transistor 24 of the dial-tone senser 16 for disabling the dial-tone senser 16 and normally open contacts A2 in series with the ON button 51, the power source 50 and the motor M.

The magnetic recording-reproducing head 18 is movable to any of the transverse recording channels on the magnetic drum 19 for the recording of dial pulses from the dial 14 in a manner described in the above-identified patent and for reproduction of impulses recorded thereon. Such impulses are introduced through the telephone set 10 to the telephone line 13 over conductor 52. Additionally, pulses scanned by the head 18 are introduced via conductor 53 into a monostable multivibrator 54 made up of transistors 55 and 56 which will respond to pulses which occur at rates in the range of the pulsing speed of the repertory dialer, e.g., 10–15 pulses per second and not appreciably outside of that range. In this way it acts as a filter to prevent spurious pulses which may be caused by noise or contact chatter reproduced by the dialer. The output of the monostable multivibrator 54 is introduced into a four-stage counter 58 (FIGS. 2 and 3) made up of four transistor multivibrators 60, 61, 62 and 63 via conductor 57. The first and fourth counter stages shown in FIGS. 2 and 3, respectively, include output connections via conductors 64 and 65, respectively, constituting two of three inputs to a coincidence or AND gate 70 made up of three diodes 71, 72 and 73. The third input to the AND gate 70 is, via conductor 89, from a gate 74, including transistors 80, 81 and 82 connected to the output of the repertory dialer 15 via conductor 83. This gate 74, termed the first digit train gate, includes an envelope detector consisting of a diode 84, a resistor 85 and a capacitor 86. The detector acts to control the bias on a transistor 80 operated as a switch. Upon the generation of the first pulse of the first digit in the repertory calling operation the capacitor 86 is charged, turning off the transistor 80 and at the end of the first pulse train the transistor 80 again is converted to the conducting condition, producing a positive voltage step which is used to trigger a bistable multivibrator made up of the transistors 81 and 82. The bistable multivibrator provides the third input to the AND gate 70. Initially, the output of the AND gate 70 is dependent upon the input from the counter stages 60 and 63 and during this interval an output will be obtained only when the digit "9" is registered in the counter. This latter is true because only during the storage of the digit "9" are the transistors 60B and 63B in the conducting state, as may readily be seen from the following tabulation of conditions in the four-stage binary counter 58.

| Digit | Binary Code | | | | Transistors Conducting | | | |
|---|---|---|---|---|---|---|---|---|
| | | | | | Stage 60 | Stage 61 | Stage 62 | Stage 63 |
| 1 | 0 | 0 | 0 | 1 | B | A | A | A |
| 2 | 0 | 0 | 1 | 0 | A | B | A | A |
| 3 | 0 | 0 | 1 | 1 | B | B | A | A |
| 4 | 0 | 1 | 0 | 0 | A | A | B | A |
| 5 | 0 | 1 | 0 | 1 | B | A | B | A |
| 6 | 0 | 1 | 1 | 0 | A | B | B | A |
| 7 | 0 | 1 | 1 | 1 | B | B | B | A |
| 8 | 1 | 0 | 0 | 0 | A | A | A | B |
| 9 | 1 | 0 | 0 | 1 | B | A | A | B |
| 0 | 0 | 0 | 0 | 0 | A | A | A | A |

After the first digit, the first digit train gate changes state. The voltage change disables the AND gate 70 so that no following digits are able to effect an output from the AND gate 70. This AND gate 70 constitutes a second control input to the relay control circuit 31 over lead 90 serving to switch the multivibrator made up of transistors 40 and 41 to the second stable state with the transistor 41 conducting, transistor 40 cut off, whereupon relay A is unoperated and the motor M of the repertory dialer is stopped. The transistor 41 of the relay control circuit remains in a conducting condition until a pulse from the dial tone senser 16 over lead 37 switches the transistor 40 to a conducting condition to operate relay A and resumes the operation of motor M.

The function of this invention may be easily understood in terms of the normal operating cycle in placing a call. This presupposes that several telephone numbers are recorded on the magnetic drum in the manner taught in the above-identified patent or in other suitable manner.

The subscriber in order to initiate a call selects the called party by moving the pointer 17 to a position opposite the name of the selected party and lifts the handset 11. Thereupon the switchhook contacts SH1, SH2 and SH3 are closed, the telephone set connected to the line 13 and the control circuitry energized from the power supply 50 which was in standby condition. The transient produced by the energizing of the control circuitry is utilized over conductors 91, 92 and 93 to set all of the multivibrators in the first digit train gate 74, the relay control circuit 31, the monostable multivibrator 54 and all of the stages 60, 61, 62 and 63 to the non-operated or first stable state.

The subscriber may next operate the ON button 51 of the repertory dialer 15 without awaitnig a dial tone on the line 13. The dial-tone senser, conditioned over switchhook contacts SH3 is insensitive to switching transients received over the line 13 but upon the presence of dial-tone frequencies on the line of sufficient duration, produces an output pulse over conductor 37 which triggers the multivibrator of the relay control circuit 31 made up of the transistors 40 and 41 whereupon the relay A is operated, the dial-tone senser 16 disabled by the opening of the contacts A1 and the motor M energized by the closure of the contacts A2. The motor M begins its rotation of the magnetic drum 19 and the reproducing head 18 scans the digits recorded thereon.

As the pulses constituting the first digit are introduced onto the line through the lead 52 and the telephone set 10 they are also introduced into the monostable multivibrator 54 and the counter 58 via the conductor 53. The first pulse of the first digit introduced via lead 83 into the first digit train gate 74 switches the multivibrator made up of the transistors 81 and 82 to its second stable condition producing an output on lead 89 to the AND gate 70 which remains thereon until the end of the first digit and the multivibrator of the gate 74 then returns to its first stable condition.

Pulses introduced into the counter 58 switch the individual transistors of the stages 60 through 63 in the manner indicated in the tabulation above. Each time that the transistor 60B is conducting there is an output on the lead 64 to the AND gate 70 occurring with the first and each odd numbered pulse. There is an output over lead 65 when the transistor 63B conducts, to wit, as the last pulse of the digit "9" only is scanned. Therefore, if the digit scanned is a "9" there will be an output on each of the leads 64 and 65. Since there already is an output on the third input to the AND gate 70, lead 89, the AND gate 70 is opened and allows a pulse to pass over lead 90 to the relay control circuit 31 at the base input to the transistor 41. This pulse switches the multivibrator of the relay control circuit to the second stable condition and cuts off transistor 42 allowing the relay A to release. The opening of the contacts A2 stops the advance of the motor M and the closing of the contacts A1 reconditions the dial-tone senser 16.

The apparatus remains inactive until a second dial tone appears at its input, this dial tone originating at the central office. The second dial tone triggers the multivibrator of the relay control circuit 31 in the same manner as the first dial tone whereupon the motor resumes its advance of the drum 19 and the dial-tone senser 16 is again disabled. The remainder of the stored digits are thereupon pulsed out onto the telephone line and the connection completed. During this period of the pulsing of the remainder of the number the pulses generated are introduced into the counter 58 and hence will provide input pulses on the leads 64 and 65 of the AND gate 70. However, no third input can appear since the first digit train gate 74 is not reset until the next call is initiated. This latter arrangement prevents the subsequent disabling of the outpulsing by the counting of a "9" which appears as the second or other subsequent digit.

At the completion of the outpulsing, the rotation of the drum 19, the motor M is stopped in the manner taught in the above-identified patent and the repertory dialer has completed its function.

The apparatus as above described is intended for use in private branch exchange installations. The advantage of being dial-tone responsive in initiating the outpulsing cycle is fully as useful in non-private branch exchange installations. Therefore, this apparatus may be used directly connected to a telephone line without the utilization of the counter 58 and the first pulse train gate 74. This may be accomplished by the disabling of these last-mentioned circuits. Disablement of the counter may be effected by the operation of pushbutton switch 100 normally closed in series with conductor 53, and by the operation of similar pushbutton 101 in series with conductor 90. These controls in normal installations are not available to the subscriber but are operated either to enable or disable the private branch exchange elements by the telephone installer. Arranged for direct connection to the telephone line, the relay control circuit 31 now includes only the control input 37 for switching from the first to the second conduction state in which the relay A is operated and the control input 92 from the local power supply which serves to switch the multivibrator made up of transistors 40 and 41 back to its first stable state at the beginning of each calling cycle.

The operation under these direct connection arrangements parallels the initial steps as described for private branch exchange installations only that upon the enablement of the motor M after the reception of a dial tone, the motor M remains conditioned until the entire stored number is outpulsed onto the telephone line.

This invention is described above in conjunction with a conventional telephone signaling system employing interruptions of direct current for conveying the calling signal. However, it has been proposed, for example, in the patent application of L.A. Meacham and F. West, Serial No. 759,474, filed September 8, 1958, that certain advantages exist in the use of a pair of frequencies generated at the telephone substation as the calling signal with a different pair of frequencies all in the voice-frequency range assigned to respective digits. In such a system the utilization of this present invention is possible and, in fact, in certain respects allows the embodiment to be simplified somewhat. For example, the mono stable multivibrator 54 and the four-stage counter 58 which serve to provide an output when the digit "9" is scanned may be replaced by a pair of filters terminating in an AND gate similar to the AND gate 70 tuned to the frequencies assignad to the digit "9." Similarly, the first digit train gate 74 may be replaced by a bank of filters connected to the lead 83 and terminating in an AND gate of the type of gate 70 so that upon the detection of two signal frequencies indicative of the presence of a scanned digit an enabling signal will appear on the lead 89. From the standpoint of the relay control circuit the operation of this invention when so modified remains the same. In such modified form the AND gate 70 will similarly be opened upon a registration of the scanning of the first digit when the digit is a "9."

In all cases it is understood that the above described arrangements are merely illustrative of the principles of the invention. Numerous and varied other embodiments may be devised in accordance with these principles by those skilled in the art without departing from the spirit and scope of the invention.

What is claimed is:

1. In a repertory dialer having a subscriber station including a storage medium for storing groups of signals representative of groups of digits comprising telephone numbers, means for scanning a selected group of signals stored in the storage medium, a motor for advancing the storage medium relative to the scanning means, the advancement resulting in the reproduction of the signals scanned by the scanning means, means for connecting the motor to a power source, and means for connecting the repertory dialer to a telephone line, the combination therewith of a control circuit comprising a filter coupled to the telephone line and tuned to dial tone frequencies, and relay means operated responsive to dial tone energy passed by the filter, the relay means having normally open contacts that are closed and normally closed contacts that are opened by the operation of the relay, the normally open contacts being in series with the motor connecting means, the motor being energized upon the concurrent operation of the motor connecting means and the relay means, and the normally closed contacts being in series with the filter, the filter being disabled upon the operation of the relay means.

2. In a subscriber station including a repertory dialer having a storage medium for storing groups of signals representative of groups of digits comprising telephone numbers, means for scanning a selected group of signals stored in the storage medium, a motor for advancing the storage medium relative to the scanning means, the advancement resulting in the reproduction of the signals scanned by the scanning means, means for connecting the motor to a power source, and means for connecting the repertory dialer to a telephone line, the combination therewith of a control circuit comprising a filter coupled to the telephone line and tuned to only dial tone frequencies, a bistable device switched from a first to a second stable state responsive to dial tone energy passed by the filter, and relay means operated when the bistable device is in the second stable state, the relay means having normally open contacts that are closed and normally closed contacts that are opened by the operation thereof, the normally open contacts being in series with the motor connecting means, the motor being energized upon the concurrent operation of the motor connecting means and the relay means, and the normally closed contacts being in series with the filter, the filter being disabled upon the operation of the relay means.

3. In a subscriber station including a repertory dialer having a storage medium for storing groups of signals representative of groups of digits comprising telephone numbers, means for scanning a selected group of signals stored in the storage medium, a motor for advancing the storage medium with respect to the scanning means, the advancement resulting in the scanning means reproducing the signals scanned thereby, means for connecting the motor to a power source, and means for connecting the repertory dialer to a telephone line, the combination therewith of a control circuit comprising a filter coupled to the telephone line and tuned to dial tone frequencies, a bistable device switched from a first to a second stable state responsive to dial tone energy passed by the filter, relay means operated only when the bistable device is in the second stable state, and means responsive to the reproduction of an initial signal representative of a particular digit for switching the bistable device from the second to the first stable state, the relay means having normally open contacts in series with the motor connecting means and normally closed contacts in series with the filter.

4. In a subscriber station including a repertory dialer having a storage medium for storing groups of signals representative of groups of digits comprising telephone numbers, means for scanning a selected group of signals stored in the storage medium, a motor for advancing the storage medium with respect to the scanning means, the advancement resulting in the scanning means reproducing the signals scanned thereby, means for connecting the motor to a power source, and means for connecting the repertory dialer to a telephone line, the combination therewith of a control circuit comprising means for connecting the control circuit to a power source, a filter coupled to the telephone line and tuned to dial tone frequencies, a bistable device switched from a first to a second stable state responsive to dial tone energy passed by the filter, relay means operated when the bistable device is in the second stable state, the relay means having normally open contacts in series with the motor connecting means, and normally closed contacts in series with the filter, and means responsive to the reproduction of an initial signal representative of a particular digit for switching the bistable device from the second to the first stable state, the initial signal responsive means comprising a first gate openable upon the operation of the control circuit connecting means and closable upon the completion of the signal representative of the initial digit, and a second gate openable upon the reproduction of a signal representative of the particular digit during the open period of the first gate.

5. In a subscriber station including a repertory dialer having a storage medium for storing groups of signals representative of groups of digits comprising telephone numbers, transducer means for scanning a selected group of signals stored in the storage medium, a motor for advancing the storage medium relative to the transducer means, the advancement resulting in the reproduction of the signals scanned by the transducer means, means for connecting the motor to a power source, and means for connecting the repertory dialer to a telephone line, the combination therewith of a control circuit comprising a filter coupled to the telephone line and tuned to dial tone frequencies, relay means operated responsive to dial tone energy passed by the filter, the relay means having normally open contacts that are closed and normally closed contacts that are opened by the operation of the relay, the normally open contacts being in series with the motor connecting means, the motor being energized upon the concurrent operation of the motor connecting means and the relay means, and the normally closed contacts being in series with the filter, the filter being disabled upon the operation of the relay means, a counter connected to the transducer means for receiving the signal reproduced as a result of the advancement of the storage medium relative to the transducer means, and means responsive to a predetermined count by said counter for disabling the relay means so as to de-energize the motor and re-enable the filter.

6. In a subscriber station including a repertory dialer having a storage medium for storing groups of signals representative of groups of digits comprising telephone numbers, transducer means for scanning a selected group of signals stored in the storage medium, a motor for advancing the storage medium relative to the transducer means, the advancement resulting in the reproduction of the signals scanned by the transducer means, means for connecting the motor to a power source, and means for connecting the repertory dialer to a telephone line, the combination therewith of a control circuit comprising a filter coupled to the telephone line and tuned to dial tone frequencies, relay means operated responsive to dial tone energy passed by the filter, the relay means having normally open contacts that are closed and normally closed contacts that are opened by the operation of the relay, the normally open contacts being in series with the motor connecting means, the motor being energized upon the concurrent operation of the motor connecting means and the relay means, and the normally closed contacts being in series with the filter, the filter being disabled upon the operation of the relay means, a counter and first gate means connected to the transducer means for receiving the signals reproduced as a result of the advancement of the storage medium relative to the transducer means, the first gate means being openable prior to the reproduction of a signal representative of a first digit and closable upon the termination of the reproduction of the signal representative of the first digit, and second gate means openable upon a predetermined count of the counter during the open period of the first gate, the opening of the second gate disabling the relay means so as to de-energize the motor and re-enable the filter.

7. In a subscriber station including a repertory dialer having a storage medium for storing groups of signals representative of groups of digits comprising telephone numbers, transducer means for scanning a selected group of signals stored in the storage medium, a motor for advancing the storage medium relative to the transducer means, the advancement resulting in the reproduction of the signals scanned by the transducer means, means for connecting the motor to a power source, and means for connecting the repertory dialer to a telephone line, the combination therewith of a control circuit comprising a filter coupled to the telephone line and tuned to dial tone frequencies, a bistable device switched from a first to a second stable state responsive to dial tone energy passed by the filter, and relay means energizable only when the bistable device is in the second stable state, the relay means having normally open contacts in series with the motor connecting means and normally closed contacts in series with the filter, a counter and first gate means connected to the transducer means for receiving the signals reproduced as a result of the advancement of the storage medium relative to the transducer means, the first gate means being openable prior to the reproduction of a signal representative of a first digit and closable upon the termination of the reproduction of the signal representative of the first digit, and second gate means openable upon a predetermined count of the counter during the open period of the first gate, the opening of the second gate switching the bistable device from the second to the first stable state.

8. In a subscriber station a repertory dialer having a storage medium for storing groups of signals representative of groups of digits comprising telephone numbers, means for connecting the repertory dialer to a telephone line, manual controls for the subscriber to select the telephone number to be transmitted over the telephone line and for initiating the transmitting operation, and means for advancing the storage medium to transmit the signals representative of the selected telephone number, the combination therewith of a control circuit comprising means for temporarily disabling the advancing means upon the operation of the manual control for initiating the transmitting operation, means responsive to a dial tone on the telephone line for enabling the advancing means, counter means for determining the signals representative of the first digit transmitted over the telephone line, means responsive to a predetermined count by the counter means for disabling the advancing means, and means responsive to the presence of a second dial tone on the telephone line for re-enabling the advancing means.

References Cited in the file of this patent

UNITED STATES PATENTS 2,697,140 Cornell ---------------- Dec. 14, 1954
2,861,131 Villmann -------------- Nov. 18, 1958
2,892,897 Vidal ----------------- June 30, 1959